United States Patent Office 2,713,070
Patented July 12, 1955

2,713,070

2-ALKOXY-4-HYDROXY-HEXAHYDRO-NAPHTHALENES

Angelo J. Speziale, Kirkwood, Mo., assignor to Monsanto Chemical Company, St. Louis, Mo., a corporation of Delaware No Drawing. Application December 15, 1952, Serial No. 326,159

10 Claims. (Cl. 260—611)

This invention relates to new and useful alkoxy substituted naphthalenes. More specifically this invention relates to 2-alkoxy-4-hydroxy-4a-methyl-1,4,4a,5,8,8a-hexahydronaphthalenes and to the process for making same.

The alkoxy substituted naphthalenes of this invention may be represented by the structural formula

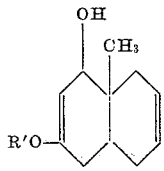

where R' is a short chain alkyl radical such as methyl, ethyl, propyl, isopropyl, butyl, amyl, etc.

The alkoxy substituted naphthalenes of this invention are useful as insecticides. The new compounds are also useful intermediates in the total synthesis of steroids, particularly the adrenal cortical hormones such as cortisone.

It will be obvious to those skilled in the art that the new compounds of this invention contain three optically active carbon atoms. As a result thereof these compounds may exist in eight optically active forms or four racemates. All such forms are contemplated as coming within the scope of this invention. The notations "cis" and "trans" as used in the specification indicate the spacial figuration of the CH₃ group and H at positions 4a and 8a, respectively, in the structural formula. It is to be understood, however, that where no notation appears with the name of the new alkoxy naphthalenes that the name is to be interpreted in its generic sense, i. e., as representing the individual isomers in separated form as well as the racemic mixtures thereof or the total unresolved mixture of isomers.

The trans isomers of the new compounds of this invention are particularly useful in the preparation of "trans-bicyclic ketones," i. e. compounds of the structure

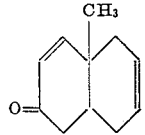

(trans-2-keto-4a-methyl-1,2,4a,5,8,8a-hexahydronaphthalene)

which ketones are readily obtainable by the acid hydrolysis of the alkoxy substituted naphthalenes of this invention. The mechanism of the hydrolysis reaction may be represented by the following flow diagram

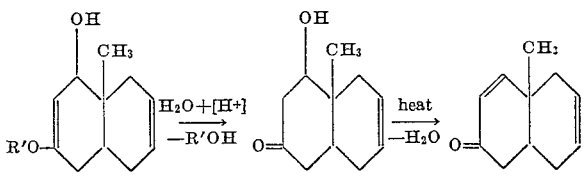

The "trans-bicyclic ketones" are important intermediates in the total synthesis of steroids having cortisone-like activity (J. A. C. S., vol. 74, p. 4233ff, September, 1952).

The new compounds of this invention may be conveniently prepared by reacting a 2-alkoxy-4-keto-4a-methyl-1,4,4a,5,8,8a-hexahydronaphthalene

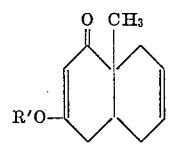

wherein R' has the same significance as aforenoted, with lithium aluminum hydride in an anhydrous medium. These alkoxy substituted naphthalenone reactants are described and claimed in my co-pending application Serial No. 325,703, filed December 12, 1952.

As illustrative of the new compounds and the preparation thereof is the following.

Example I

To a suitable reaction vessel is added substantially 2.01 parts by weight (substantially 0.053 mol) of lithium aluminum hydride and 72 parts by weight of anhydrous diethyl ether. The slurry so obtained is agitated for about 40 minutes under an atmosphere of nitrogen. To the slurry is then added a solution containing 15.8 parts by weight (substantially 0.082 mol) of dl-trans-2-methoxy-4-keto-4a-methyl-1,4,4a,5,8,8a-hexahydronaphthalene in 79 parts by weight of anhydrous diethyl ether over a period of about 20 minutes. During the addition the temperature rises to about 35° C. Upon completion of the alkoxy substituted naphthalenone addition the reaction mix is agitated for about 50 minutes. Thereupon the mixture is cooled to about 5° C. and thereto is cautiously added approximately 50 parts by weight of cold water. The organic layer is separated from the aqueous layer and then the latter is washed with two 20 parts by weight portions of diethyl ether. The ether washings are combined with the original ether layer and subjected to vacuum distillation. Upon removal of the other solvent a good yield of a light yellow oily liquid identified as dl-trans-2-methoxy-4-hydroxy-4a-methyl-1,4,4a,5,8,8a-hexahydronaphthalene is obtained.

Example II

Employing the procedure of Example I but replacing dl-trans-2-methoxy-4-keto-4a-methyl-1,4,4a,5,8,8a - hexahydronaphthalene with an equimolecular weight of l-trans-2-methoxy-4-keto-4a-methyl-1,4,4a,5,8,8a-hexahydronaphthalene a good yield of l-trans-2-methoxy-4-hydroxy - 4a-methyl-1,4,4a,5,8,8a-hexahydronaphthalene is obtained. The produce is a light yellow oil.

Example III

Employing the procedure of Example I but replacing dl-trans-2-methoxy-4-keto-4a-methyl-1,4,4a,5,8,8a - hexahydronaphthalene with an equimolecular weight of unresolved 2-ethoxy-4-keto-4a-methyl-1,4,4a,5,8,8a-hexahydronaphthalene a good yield of unresolved 2-ethoxy-4-hydroxy - 4a - methyl-1,4,4a,5,8,8a-hexahydronaphthalene is obtained. The product is a light yellow oil.

Example IV

Employing the procedure of Example I but replacing dl-trans-2-methoxy-4-keto-4a-methyl-1,4,4a,5,8,8a - hexahydronaphthalene with an equimolecular weight of unresolved 2 - n - propoxy-4-keto- 4a-methyl-1,4,4a,5,8,8a-hexahydronaphthalene a good yield of unresolved 2-n- propoxy-4-hydroxy-4a-methyl-1,4,4a,5,8,8a-hexahydronaphthalene is obtained.

*Example V*

Employing the procedure of Example I but replacing dl-trans-2-methoxy-4-keto-4a-methyl-1,4,4a,5,8,8a - hexahydronaphthalene with an equimolecular weight of dl-trans-2-n-butoxy-4-keto-4a-methyl-1,4,4a,5,8,8a - hexahydronaphthalene a good yield of dl-trans-2-n-butoxy-4-hydroxy-4a-methyl-1,4,4a,5,8,8a - hexahydronaphthalene is obtained.

*Example VI*

Employing the procedure of Example I but replacing dl-trans-2-methoxy-4-keto-4a-methyl-1,4,4a,5,8,8a - hexahydronaphthalene with an equimolecular weight of l-trans - 2 - pentoxy-4-keto-4a-methyl-1,4,4a,5,8,8a - hexahydronaphthalene a good yield of l-trans-2-pentoxy-4-hydroxy-4a-methyl-1,4,4a,5,8,8a - hexahydronaphthalene is obtained.

Although the preceding examples have illustrated specific embodiments of this invention, it will be obvious to those skilled in the art that the reactants and reaction conditions set forth in the examples may be varied substantially without departing from the spirit or scope of this invention. As for example, the reaction may be carried out with other lower aliphatic ether solvents such as tetrahydrofuran, di-isopropyl ether, di-n-propyl ether, methyl isopropyl ether, ethyl n-butyl ether, di-n-butyl ether, di(beta methoxy ethyl) ether, di(beta ethoxy ethyl) ether, and the like, provided the system be anhydrous. However, diethyl ether is particularly preferred.

The quantity of lithium aluminum hydride may be varied, for example anywhere from about 0.25 to about 2.0 molecular equivalents may be used per molecular equivalent of the alkoxy naphthalenone reactant, however, amounts in the range of 0.5–1.0 molecular equivalents of lithium aluminum hydride is preferred.

The temperature of the reaction may be varied over a wide range, although reaction temperatures in the range of about 0° C. to 50° C. are preferred.

While the invention has been described with respect to certain embodiments it is not so limited and it is to be understood that variations in reactants and reaction conditions obvious to those skilled in the art may be made without departing from the spirit or scope of this invention.

What is claimed is:

1. As new compounds 2-alkoxy-4-hydroxy-4a-methyl-1,4,4a,5,8,8a-hexahydronaphthalenes of the formula

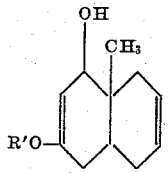

where R′ is a short chain alkyl radical.

2. The compounds of claim 1 wherein R′ is an alkyl radical containing 1 to 5 carbon atoms.

3. The trans-isomers of the compounds of claim 2.

4. 2 - methoxy-4-hydroxy-4a-methyl-1,4,4a,5,8,8a-hexahydronaphthalene.

5. 2 - ethoxy-4-hydroxy-4a-methyl-1,4,4a,5,8,8a - hexahydronaphthalene.

6. dl - trans - 2 - methoxy - 4 - hydroxy - 4a - methyl-1,4,4a,5,8,8a-hexahydronaphthalene.

7. l-trans - 2 - methoxy - 4 - hydroxy - 4a - methyl-1,4,4a,5,8,8a-hexahydronaphthalene.

8. In the process of making the compounds of claim 1 the step which comprises reacting under anhydrous conditions lithium aluminum hydride and a 2-alkoxy-4 - keto-4a-methyl-1,4,4a,5,8,8a-hexahydronaphthalene of the formula

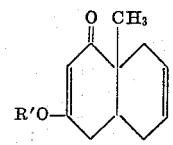

where R′ is a short chain alkyl radical, and recovering the 2 - alkoxy-4-hydroxy-4a-methyl-1,4,4a,5,8,8a-hexahydronaphthalene.

9. In the process of making the compound of claim 4 the step which comprises reacting under anhydrous conditions lithium aluminum hydride and 2-methoxy-4-keto-4a-methyl-1,4,4a,5,8,8a-hexahydronaphthalene in diethyl ether, and recovering the 2-methoxy-4-hydroxy-4a-methyl-1,4,4a,5,8,8a-hexahydronaphthalene.

10. In the process of making the compound of claim 4 the step which comprises reacting under anhydrous conditions lithium aluminum hydride and 2-methoxy-4-keto-4a-methyl-1,4,4a,5,8,8a-hexahydronaphthalene in diethyl ether, the ratio of chemical equivalents of lithium aluminum hydride to 2-methoxy - 4 - keto-4a-methyl-1,4,4a,5,8,8a-hexahydronaphthalene being in the range of 0.5–1.0:1.0, and recovering the 2-methoxy-4-hydroxy-4a-methyl-1,4,4a,5,8,8a-hexahydronaphthalene.

No references cited.